(12) United States Patent
Shankar et al.

(10) Patent No.: US 7,447,679 B2
(45) Date of Patent: Nov. 4, 2008

(54) OPTIMIZING EXECUTION OF A DATABASE QUERY BY USING THE PARTITIONING SCHEMA OF A PARTITIONED OBJECT TO SELECT A SUBSET OF PARTITIONS FROM ANOTHER PARTITIONED OBJECT

(75) Inventors: Shrikanth Shankar, Mountain View, CA (US); Vikram Shukla, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 472 days.

(21) Appl. No.: 10/857,651

(22) Filed: May 28, 2004

(65) Prior Publication Data

US 2005/0251511 A1 Nov. 10, 2005

Related U.S. Application Data

(60) Provisional application No. 60/568,933, filed on May 7, 2004.

(51) Int. Cl.
*G06F 17/30* (2006.01)
*G06F 7/00* (2006.01)
(52) U.S. Cl. .................................. 707/3; 707/4; 707/5
(58) Field of Classification Search .................... 707/3, 707/4, 5
See application file for complete search history.

(56) References Cited

U.S. PATENT DOCUMENTS 6,014,656 A * 1/2000 Hallmark et al. ............... 707/2
6,092,062 A * 7/2000 Lohman et al. ............... 707/2
6,112,198 A * 8/2000 Lohman et al. ............... 707/3
6,226,639 B1 * 5/2001 Lindsay et al. ............... 707/5

(Continued)

OTHER PUBLICATIONS

Goldstein, Jonathan, et al., "Optimizing Queries Using Materialized Views: A Practical, Scalable Solution", SIGMOD 2001, Santa Barbara, CA, May 21-24, 2001, pp. 331-342.*

(Continued)

*Primary Examiner*—Cam-Y Truong
*Assistant Examiner*—Robert Stevens
(74) *Attorney, Agent, or Firm*—Park, Vaughan & Fleming LLP

(57) ABSTRACT

One embodiment of the present invention provides a system that optimizes the execution of a database query involving a target partitioned-database-object. During system operation, the database receives a query. If the query has a predicate that includes a partition-mapping function that uses the partitioning schema of a partitioned database-object and a list of columns from one or more tables to express a mapping of the list of column values to the partitions of the partitioned database-object, the system determines the compatibility of the partitioning schemas of the target partitioned-database-object and the partitioned database-object. Next, if the partitioning schemas are compatible, and if the list of columns is compatible with the partitioning keys of the target partitioned-database-object and the partitioned database-object, the system attempts to identify a subset of partitions in the target partitioned-database-object that satisfy the predicate. Finally, if a subset of partitions is successfully identified, the system performs the query only on the identified subset of partitions, and not on the other partitions, thereby optimizing the execution of the query by reducing the number of partitions that need to be accessed.

15 Claims, 2 Drawing Sheets

U.S. PATENT DOCUMENTS

| | | | |
|---|---|---|---|
| 6,256,621 B1 * | 7/2001 | Tsuchida et al. | 707/2 |
| 6,356,890 B1 * | 3/2002 | Agrawal et al. | 707/2 |
| 6,439,783 B1 * | 8/2002 | Antoshenkov | 707/3 |
| 6,510,422 B1 * | 1/2003 | Galindo-Legaria et al. | 707/2 |
| 6,513,029 B1 * | 1/2003 | Agrawal et al. | 707/2 |
| 6,567,802 B1 * | 5/2003 | Popa et al. | 707/3 |
| 6,571,233 B2 * | 5/2003 | Beavin et al. | 707/2 |
| 6,795,821 B2 * | 9/2004 | Yu | 707/3 |
| 6,931,395 B2 * | 8/2005 | Day et al. | 707/3 |
| 2002/0184253 A1 * | 12/2002 | Agarwal et al. | 707/206 |
| 2002/0194157 A1 * | 12/2002 | Zait et al. | 707/2 |
| 2003/0055822 A1 * | 3/2003 | Yu | 707/6 |
| 2003/0093415 A1 * | 5/2003 | Larson et al. | 707/3 |
| 2004/0006574 A1 * | 1/2004 | Witkowski et al. | 707/104.1 |
| 2004/0122845 A1 * | 6/2004 | Lohman et al. | 707/102 |
| 2004/0148273 A1 * | 7/2004 | Allen et al. | 707/2 |
| 2004/0148293 A1 * | 7/2004 | Croisettier et al. | 707/100 |
| 2004/0205057 A1 * | 10/2004 | Hutchison et al. | 707/3 |
| 2004/0260684 A1 * | 12/2004 | Agrawal et al. | 707/3 |
| 2005/0027692 A1 * | 2/2005 | Shyam et al. | 707/3 |
| 2005/0091208 A1 * | 4/2005 | Larson et al. | 707/3 |
| 2005/0192951 A1 * | 9/2005 | Day et al. | 707/3 |

OTHER PUBLICATIONS

Mendelzon, Alberto O., et al., "Concise Descriptions of Subsets of Structured Sets", PODS 2003, San Diego, CA, Jun. 9-12, 2003, pp. 123-133.*

Chaudhuri, Surajit, "An Overview of Query Optimization in Relational Systems", PODS '98, Seattle, WA, © 1998, pp. 34-43.*

Rao, Jun, et al., "Automating Physical Database Design in a Parallel Database", ACM SIGMOD 2002, Madison, WI, Jun. 4-6, 2003, pp. 558-569.*

Selinger, P. Griffiths, et al., "Access Path Selection in a Relational Database Management System", ACM SIGMOD 1979, Boston, MA, © 1979, pp. 23-34.*

He, Bin, et al., "Statistical Schema Matching Across Web Query Interfaces", SIGMOD 2003, San Diego, CA, Jun. 9-12, 2003, pp. 217-228.*

* cited by examiner

OPTIMIZING EXECUTION OF A DATABASE QUERY BY USING THE PARTITIONING SCHEMA OF A PARTITIONED OBJECT TO SELECT A SUBSET OF PARTITIONS FROM ANOTHER PARTITIONED OBJECT

This application hereby claims priority under 35 U.S.C. §119 to U.S. Provisional Patent Application No. 60/568,933 filed on 07 May 2004, entitled "Generating SQL Predicates to Enable Pruning on Partitioned Objects Irrespective of Partitioning Method or Object Type," by inventors Shrikanth Shankar and Vikram Shukla.

BACKGROUND

1. Field of the Invention

The present invention relates to the process for optimizing the execution of a database query. More specifically, the present invention relates to a method and an apparatus for optimizing the execution of a database query that uses the partitioning schema of a partitioned database-object to select a subset of partitions in a partitioned table.

2. Related Art

Today, many companies are storing company-wide data in large centralized databases, often called data warehouses, so that they can leverage sophisticated analytical tools to process the data to glean insights that will give them a competitive edge in the marketplace. The increasing popularity of data warehousing and other similar applications that require large databases has resulted in an explosive growth in database sizes, which has created a strong demand for technologies that can improve the manageability and performance of large databases.

Partitioning is one such key technology for building and managing large databases. In partitioning, a database-object is subdivided into smaller units, called partitions, which enables the database administrator to simplify the management of large databases. For example, partitioning can be used to support a "rolling window" load process, in which, each week's sales data can be loaded by simply adding a partition to the database. Adding a partition to the database is much more efficient and easier to manage than loading the data into a non-partitioned table. Moreover, partitioning can also be used to improve the database performance by limiting the amount of data that needs to be examined, and by enabling parallel execution of queries on multiple partitions.

In a partitioned database, it is useful, and sometimes necessary, to access a set of partitions. For example, if we want to compute statistics (e.g., number of distinct keys, number of leaf blocks, etc.) for a given index partition, then we need to access data only from that index partition. Moreover, it is very convenient to use the same construct to access data from a set of partitions, regardless of the type of the partitioned database-object, or the partitioning technique, or the partition definitions.

Typically, database user-interfaces, e.g., standard SQL, do not have constructs to access a set of partitions. Note that, while it is possible to generate a query in standard SQL to access a set of partitions of a range-partitioned or list-partitioned database-object, the query is dependent on the type of the partitioned database-object, the partitioning technique, and the partition definitions. Moreover, it is impossible to access a set of partitions of a hash-partitioned database-object by using standard SQL syntax.

Incidentally, some databases implement a partition-mapping function that uses the partitioning schema of a partitioned database-object and a list of values (usually columns from a partitioned table) to map rows to partitions of the partitioned database-object. The partition-mapping function can be used to identify a partition for a given set of column values.

Furthermore, some databases expose the partition-mapping function at the user level by extending standard SQL. When used in a predicate, this form of the partition-mapping function allows the user to specify a set of partitions. An example of a database query that has a predicate that uses the partition-mapping function is shown below select * from X where OPT(Y, X.C1, X.C2, X.C3)=N.

In this query, "OPT(Y, X.C1, X.C2, X.C3)=N" is the predicate, wherein "OPT" is the partition-mapping function, "X" is a table, "Y" is the partitioned database-object, and "X.C1, X.C2, X.C3" is a list of columns in the table. In this example, if X is partitioned and the partitioning schema of X is identical to the partitioning schema of Y, then the predicate specifies a set of partitions containing only one partition: the $N^{th}$ partition. Note that, this method for specifying a set of partitions works regardless of the type of the partitioned database-object, or the partitioning technique, or the partition definitions. Moreover, note that, this method can be used for specifying a set of partitions for a hash-partitioned database-object.

The problem with executing a database query that has a predicate that uses a partition-mapping function is that it results in poor performance, because, regardless of the set of partitions that the user wants to access, the system will have to scan through all of the partitions in the partitioned database-object and use the predicate in the query to filter out the rows that don't belong to the given set of partitions.

Thus, what is needed is a method and apparatus to execute a database query that has a predicate that uses a partition-mapping function without having to scan through all of the partitions in a partitioned database-object.

SUMMARY

One embodiment of the present invention provides a system that optimizes the execution of a database query involving a target partitioned-database-object. During system operation, the database receives a query. If the query has a predicate that includes a partition-mapping function that uses the partitioning schema of a partitioned database-object and a list of columns from one or more tables to express a mapping of the list of column values to the partitions of the partitioned database-object, the system determines the compatibility of the partitioning schemas of the target partitioned-database-object and the partitioned database-object. Next, if the partitioning schemas are compatible, and if the list of columns is compatible with the partitioning keys of the target partitioned-database-object and the partitioned database-object, the system attempts to identify a subset of partitions in the target partitioned-database-object that satisfy the predicate. Finally, if a subset of partitions is successfully identified, the system performs the query only on the identified subset of partitions, and not on the other partitions, thereby optimizing the execution of the query by reducing the number of partitions that need to be accessed.

In a variation on this embodiment, the target partitioned-database-object can be range-partitioned, list-partitioned, or hash-partitioned.

In a variation on this embodiment, the target partitioned-database-object can be a partitioned table, a partitioned index, or a partitioned materialized-view.

In a variation on this embodiment, the partitioned database-object can be range-partitioned, list-partitioned, or hash-partitioned.

In a variation on this embodiment, the partitioned database-object can be a partitioned table, a partitioned index, or a partitioned materialized-view.

In a variation on this embodiment, the target partitioned-database-object and the partitioned database-object can be the same entity.

In a variation on this embodiment, determining the compatibility of the partitioning schemas of the partitioned table and the partitioned database-object involves determining the compatibility of the partitioning techniques for the target partitioned-database-object and the partitioned database-object.

In a variation on this embodiment, determining the compatibility of the list of columns and the partitioning key of the target partitioned-database-object involves determining whether the list of columns forms a prefix of the partitioning key.

In a variation on this embodiment, determining the compatibility of the list of columns and the partitioning key of the partitioned database-object involves determining the compatibility between the data types of the columns and the data types of the elements of the partitioning key.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. For example, the device or medium can include magnetic and optical storage devices such as disk drives, magnetic tape, CDs (compact discs) and DVDs (digital versatile discs or digital video discs).

Computer System

Figure 1:
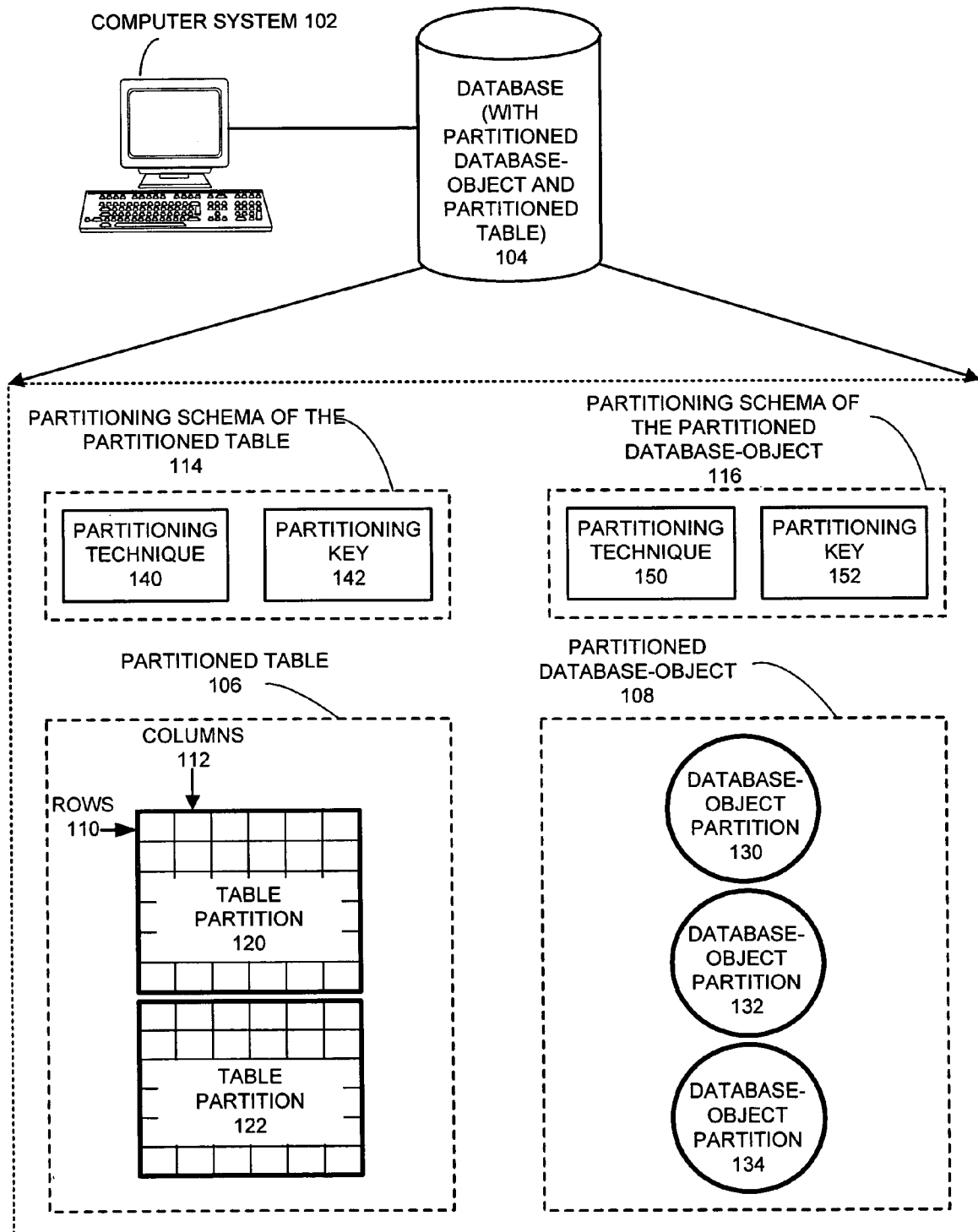
FIG. 1 illustrates a computer system with a database in accordance with an embodiment of the present invention.

FIG. 1 illustrates a computer system 102 with a database 104 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Database 104 can include any type of system for storing data in non-volatile storage. This includes, but is not limited to, database systems based upon magnetic, optical, and magneto-optical storage devices, as well as storage devices based on flash memory and/or battery-backed up memory. Database 104 includes a target partitioned-database-object, such as a partitioned table 106, that comprises a set of table partitions (120 and 122). Each table partition 120 is logically structured in terms of rows 110 and columns 112.

The partitioning schema 114 of the partitioned table 106 comprises a partitioning technique 140 and a partitioning key 142. The partitioning schema 114 of the partitioned-table specifies how the rows 110 in the partitioned table 106 are distributed among the table partitions (120 and 122).

Database 104 also includes a partitioned database-object 108 that comprises a set of database-object partitions (130, 132, and 134). The partitioning schema 116 of the partitioned database-object 108 comprises a partitioning technique 150 and a partitioning key 152. The partitioning schema 116 of the partitioned database-object specifies how the elements of the partitioned database-object 108 are distributed among the database-object partitions (130, 132, and 134).

Optimizing a Query

Figure 2:
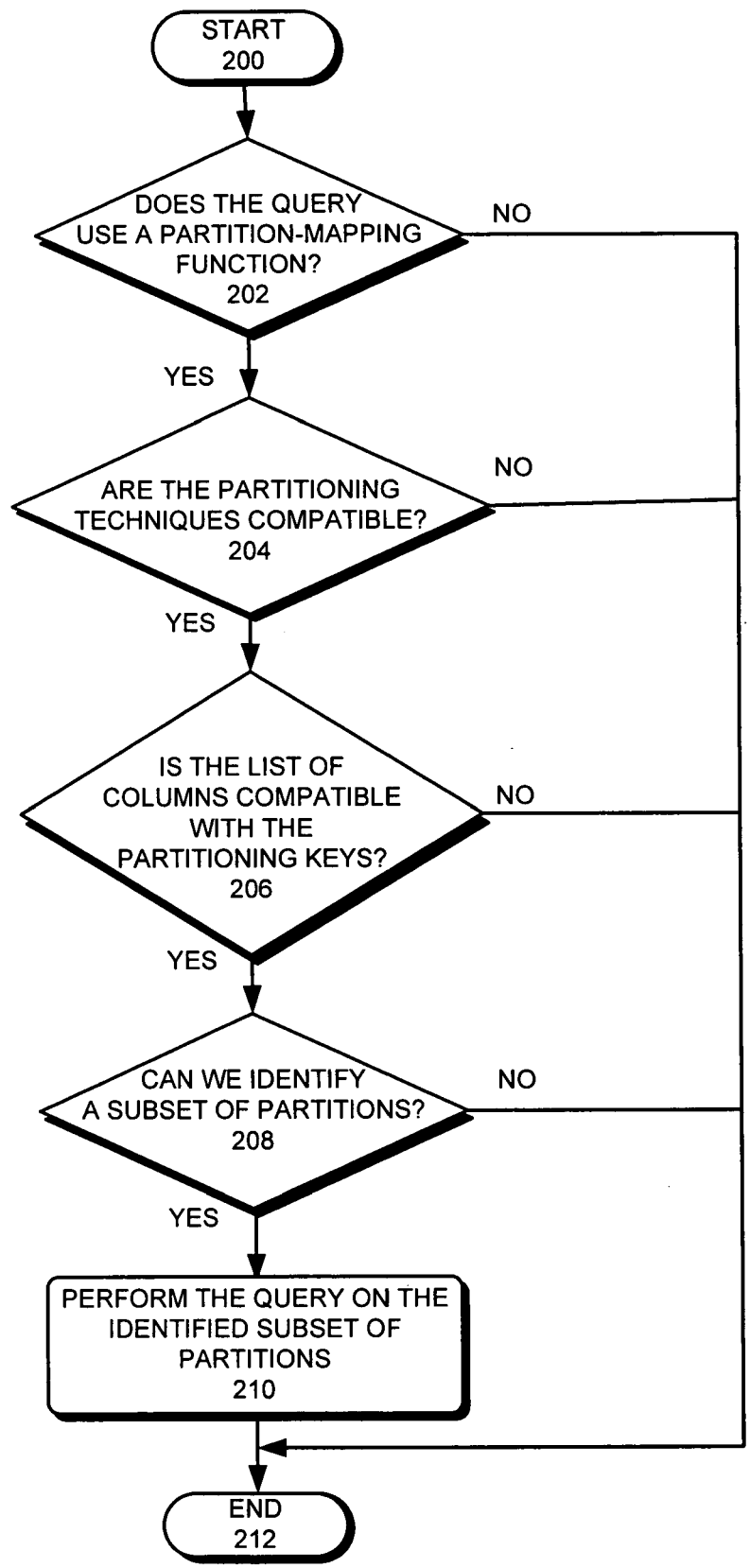
FIG. 2 presents a flow chart illustrating the process of optimizing a database query in accordance with an embodiment of the present invention.

FIG. 2 presents a flow chart illustrating the process of optimizing a database query in accordance with an embodiment of the present invention. Upon receiving a database query, the system determines whether the query has a predicate that uses a partition-mapping function (step 202) that uses the partitioning schema 116 of a partitioned database-object 108 and a list of columns 112 in the partitioned table 106. An example of a database query that has a predicate that uses a partition-mapping function is shown below select * from X where OPT(Y, X.C1, X.C2, X.C3)=N.

In this query, "OPT(Y, X.C1, X.C2, X.C3)=N" is the predicate, wherein "OPT" is the partition-mapping function, "X" is the partitioned table, "Y" is the partitioned database-object, and "X.C1, X.C2, X.C3" is a list of columns in the partitioned table. If the query has such a predicate, the system checks the compatibility of the partitioning techniques 140 and 150 (step 204). If the partitioning techniques 140 and 150 are compatible, the system then checks the compatibility of the list of columns 112 with the partitioning keys 142 and 152 (step 206), by checking whether the list of columns 112 is a prefix of the partitioning key 142 of the partitioned table, and by checking whether the data types of the columns in the list of columns 112 are compatible with the data types of the elements of the partitioning key 152. If the list of columns 112 is compatible with the partitioning keys (142 and 152), the system then attempts to identify a subset of partitions (step 208). If a subset of partitions 120 is identified successfully, the system performs the query only on the identified subset of partitions 120 (step 210), and not on the other partitions 122, thereby optimizing the execution of the query by reducing the number of partitions that need to be accessed. For example, in the query shown above, if the partitioning schema of X is identical to the partitioning schema of Y, the system will access only the $N^{th}$ partition; whereas, in the absence of the optimization, the system would have had to access all of the partitions.

Note that, a partitioning technique is always considered to be compatible with itself. In addition, a partitioning technique may also be compatible with a different partitioning technique. Although in the example shown above, we stated that X and Y are identically partitioned, that is not always necessary for optimizing the query. For example, if two range-partitioning techniques use different ranges for defining their partitions, they may still be compatible from an optimization perspective. Hash-partitioning, on the other hand, is not compatible with range-partitioning or list-partitioning, because the distribution of the keys in a hash-partitioned database-object depends on the specific hash function that is used for partitioning.

Furthermore, note that, although we have used a partitioned table 106 in the above description to illustrate the invention, it will be readily apparent to those skilled in the art that the present invention can be applied to an embodiment wherein the partitioned table is replaced by another type of partitioned database-object.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing an execution of a database query, the method comprising:
    receiving the database query for querying data in a target partitioned database-object;
        wherein the database query includes a predicate which includes a partition-mapping function that is a partitioned table;
        wherein the partition-mapping function's input parameters includes:
            a second partitioned database-object which is separate from the target partitioned database-object, and
            a list of columns in the target partitioned database-object;
    determining whether the target partitioned database-object's partitioning schema is compatible with the partitioning schema of the second partitioned database-object, wherein said determining includes:
        determining whether the target partitioned database-object's partitioning technique is compatible with the second partitioned database-object's partitioning technique; and
        if the partitioning techniques are compatible, determining whether the list of columns is compatible with partitioning keys of the database-objects by checking whether the list of columns is a prefix of a partitioning key of the partitioned table and by checking whether data types of columns in the list of columns are compatible with data types of elements of a partitioning key of the partitioning keys of the database-objects;
    identifying a subset of partitions in the target partitioned database-object that satisfy the predicate if the list of columns is compatible with the partitioning keys; and
    performing the database query on the subset of partitions, thereby optimizing the execution of the database query by reducing a number of partitions that need to be accessed.

2. The method in claim 1, wherein the target partitioned-database-object is:
    range-partitioned;
    list-partitioned; or
    hash-partitioned.

3. The method in claim 1, wherein the target partitioned-database-object is:
    a partitioned table;
    a partitioned index; or
    a partitioned materialized-view.

4. The method in claim 1, wherein the second partitioned database-object is:
    range-partitioned;
    list-partitioned; or
    hash-partitioned.

5. The method in claim 1, wherein the second partitioned database-object is:
    a partitioned table;
    a partitioned index; or
    a partitioned materialized-view.

6. A computer-readable storage medium storing instructions that when executed by a computer cause the computer to perform a method for optimizing an execution of a database query, wherein the computer-readable storage medium includes magnetic and optical storage devices, disk drives, magnetic tape, CDs (compact discs), and DVDs (digital versatile discs or digital video discs), the method comprising:
    receiving the database query for querying data in a target partitioned database-object;
    wherein the database query includes a predicate which includes a partition-mapping function that is a partitioned table;
    wherein the partition-mapping function's input parameters includes:
    a second partitioned database-object which is separate from the target partitioned database-object, and
    a list of columns in the target partitioned database-object;
    determining whether the target partitioned database-object's partitioning schema is compatible with the partitioning schema of the second partitioned database-object, wherein said determining includes:
    determining whether the target partitioned database-object's partitioning technique is compatible with the second partitioned database-object's partitioning technique; and
    if the partitioning techniques are compatible, determining whether the list of columns is compatible with partitioning keys of the database-objects by checking whether the list of columns is a prefix of a partitioning key of the partitioned table and by checking whether data types of the columns in the list of columns are compatible with data types of elements of a partitioning key of the partitioning keys of the database-objects;
    identifying a subset of partitions in the target partitioned database-object that satisfy the predicate if the list of columns is compatible with the partitioning keys; and
    performing the database query on the subset of partitions, thereby optimizing the execution of the database query by reducing a number of partitions that need to be accessed.

7. The computer-readable storage medium of claim 6, wherein the target partitioned-database-object is:
    range-partitioned;
    list-partitioned; or
    hash-partitioned.

8. The computer-readable storage medium of claim 6, wherein the target partitioned-database-object is:
    a partitioned table;
    a partitioned index; or
    a partitioned materialized-view.

9. The computer-readable storage medium of claim 6, wherein the second partitioned database-object is:
    range-partitioned;
    list-partitioned; or
    hash-partitioned.

10. The computer-readable storage medium of claim 6, wherein the second partitioned database-object is:

a partitioned table;
a partitioned index; or
a partitioned materialized-view.

11. An apparatus for optimizing the execution of a database query, the apparatus comprising:
- a processor, wherein the processor is configured to execute instructions to:
- receive database queries for querying data in a target partitioned database-object;
- wherein the database query includes a predicate which includes a partition-mapping function that is a partitioned table;
- wherein the partition-mapping function's input parameters includes:
- a second partitioned database-object which is separate from the target partitioned database-object, and
- a list of columns in the target partitioned database-object;
- determine whether the target partitioned database-object's partitioning schema is compatible with a partitioning schema of the second partitioned database-object, by:
- determining whether the target partitioned database-object's partitioning technique is compatible with the second partitioned database-object's partitioning technique; and
- if the partitioning techniques are compatible, determining whether the list of columns is compatible with partitioning keys of the database-objects by checking whether the list of columns is a prefix of a partitioning key of the partitioned table and by checking whether data types of the columns in the list of columns are compatible with data types of elements of a partitioning key of the partitioning keys of the database-objects;
- identify a subset of partitions in the target partitioned database-object that satisfy the predicate if the list of columns is compatible with the partitioning keys; and
- perform the database query on the subset of partitions, thereby optimizing the execution of the database query by reducing a number of partitions that need to be accessed.

12. The apparatus in claim 11, wherein the target partitioned-database-object is:
range-partitioned;
list-partitioned; or
hash-partitioned.

13. The apparatus in claim 11, wherein the target partitioned-database-object is:
a partitioned table;
a partitioned index; or
a partitioned materialized-view.

14. The apparatus in claim 11, wherein the second partitioned database-object is:
range-partitioned;
list-partitioned; or
hash-partitioned.

15. The apparatus in claim 11, wherein the second partitioned database-object is:
a partitioned table;
a partitioned index; or
a partitioned materialized-view.

* * * * *